United States Patent Office 3,136,821
Patented June 9, 1964

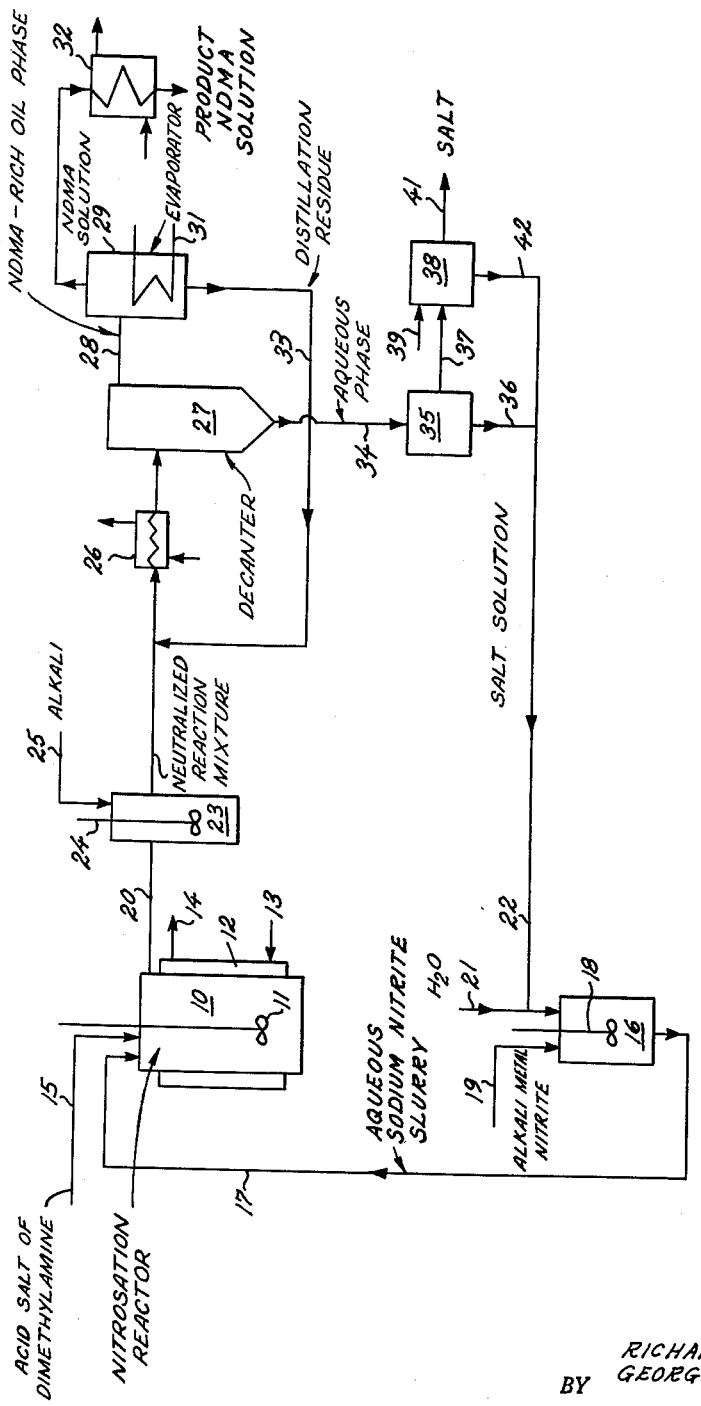

3,136,821
SYNTHESIS OF NITROSODIMETHYLAMINE
Richard C. Datin and George A. Elliott, Petersburg, Va., assignors to Allied Chemical Corporation, New York, N.Y., a corporation of New York
Filed Jan. 7, 1960, Ser. No. 1,120
9 Claims. (Cl. 260—583)

This invention relates to the synthesis of nitrosodimethylamine, hereinafter for the sake of brevity referred to as NDMA.

In this specification, all percentages are given on a weight basis.

NDMA is an important intermediate in the production of unsymmetrical dimethylhydrazine which is used as a fuel in the ballistic missile and rocket fields; it is also useful as a solvent for polymers and copolymers of acrylonitrile and has other uses.

NDMA has been synthesized by reacting dimethylamine and aqueous sodium nitrite in the presence of hydrochloric or sulfuric acids. The reactor effluent, after neutralization of excess acid with an alkali such as sodium hydroxide, consists of an NDMA-rich oil phase and an aqueous slurry of sodium chloride or sodium sulfate (depending on whether hydrochloric or sulfuric acid, respectively, is employed in the reaction) containing a portion of the NDMA produced. When the reaction between the dimethylamine and the aqueous sodium nitrite is carried out, for example, in the presence of sulfuric acid and the separation of the two phases is conducted at temperatures of from 35° to 50° C., the oil phase consists of from 45% to 54% of the total reactor effluent and contains from 38% to 52% NDMA, from 47% to 58% water, and from 1% to 4% sodium sulfate. The aqueous slurry constitutes from 46% to 55% of the total reactor effluent and contains from 2% to 3% NDMA, about 39% water and from 58% to 59% sodium sulfate.

In order to obtain substantially complete recovery of the NDMA from the reactor effluent, it has been proposed to distill the entire neutralized reactor effluent to drive off overhead the NDMA, producing a dilute aqueous solution of NDMA. In some cases, water is added to the dry salt residue of the distillation and this water and residual NDMA are distilled over into the first distillate. This produces an excessively dilute NDMA solution. This dilute solution cannot be concentrated by distillation to above 23% of NDMA because water and NDMA form an azeotrope containing about 23% NDMA. In order to concentrate such NDMA solutions, it has been proposed to add potassium carbonate thereto to effect separation of part of the NDMA as a separate upper liquid layer; such procedures result in a loss of NDMA to the lower liquid layer.

In procedures heretofore involving separation of the oil layer from the lower aqueous slurry of salt containing small amounts of NDMA, disposition of the lower aqueous layer presents serious problems. Discarding it as both hazardous and uneconomic. Evaporation, on the other hand, yields only very dilute NDMA requiring further complicated and expensive processing to obtain NDMA suitable for use in hydrogenation procedures to produce dimethylhydrazine. Such further processing of the dilute NDMA, from an economic standpoint, cannot be justified chiefly because the amount of NDMA recovered does not justify the expense involved in effecting the recovery. Similar problems arise in connection with the disposition of the residue obtained by distillation of the upper NDMA-rich oil layer in order to produce NDMA, substantially free of salt, and suitable for hydrogenation to produce dimethylhydrazine. The evaporator bottoms from such distillation of the oil layer consist of salt slurried in concentrated NDMA; passage of these bottoms to a sewer is both hazardous and uneconomic.

It is among the objects of the present invention to provide a process for synthesizing NDMA by reacting non-oxidizing mineral acid salts, such as sulfuric or hydrochloric acid salts of dimethylamine and an aqueous alkali metal nitrite such as sodium or potassium nitrite, neutralizing the excess acid with an alkali and separating the NDMA-rich oil phase from the salt-rich aqueous slurry, in which process substantially all of the NDMA in the aqueous slurry is recovered in a simple and expeditious manner.

It is another object of this invention to provide such process in which substantially all of the NDMA in the evaporator bottoms produced by the evaporation or distillation of the NDMA-rich oil phase is recovered in a simple and expeditious manner.

Another object of this invention is to provide such process, which results in high yields of NDMA and which eliminates the problems entailed in the handling of wastes containing appreciable amounts of NDMA.

Other objects and advantages of this invention will be apparent from the following detailed description thereof.

As indicated, the invention includes reaction of acid salts of dimethylamine with alkali metal nitrites such as sodium or potassium nitrites. Since sodium nitrite is preferred because it is less expensive, the description of the invention which follows will be limited to sodium nitrite; it will be appreciated, however, that the invention includes the use of other alkali metal nitrites in equivalent amounts.

The dimethylamine acid salt and aqueous sodium nitrite may be reacted in the molar proportions of from 0.95 to 1.05 mols of dimethylamine and from 0.87 to 1.2 mols of sodium nitrite in the presence of from 0.5 to 0.6 mols of sulfuric acid at a temperature of from 50° to 90° C. An equivalent amount of hydrochloric acid (1–1.2 mols) may be used in lieu of sulfuric acid. The reactor effluent, after neutralization of excess acid with an alkali, such as sodium hydroxide or sodium carbonate, is stratified to form an upper NDMA-rich oil phase and a lower salt-rich aqueous slurry phase. These two phases are separated. Solid salt is removed from the aqueous slurry by decantation, filtration, centrifugal separation or otherwise. In accordance with this invention, the salt-saturated aqueous phase is recycled to the nitrosation zone.

The aqueous sodium nitrite introduced into the nitrosation zone when making the first batch or when starting up in continuous operation, should have a concentration of from 30% to 40% of sodium nitrite. Upon introduction of the aqueous slurry into the nitrosation zone in the case of batch operation or once steady-state operation has been reached in the case of continuous operation, the aqueous sodium nitrite in the nitrosation zone should have a concentration of from 30% to 40% of sodium nitrite based on the content of sodium nitrite and water in this zone.

In continuous operation, solid sodium nitrite feed is conveniently added to the aqueous phase prior to recycle to the reactor in amount to form a slurry containing precipitated salt and 30% to 40% sodium nitrite based on sodium nitrite and water content of this slurry. Alternatively, dry sodium nitrite may be added directly to the reactor to supply the required sodium nitrite feed; all or substantially all of the sodium nitrite thus added dissolves in the aqueous reaction medium. In all cases, the water in the salt and NDMA-saturated aqueous phase recycled to the nitrosation zone replaces all or a substantial portion of the water which would otherwise be fed to the nitrosation zone to supply the water needed to serve as reaction medium.

Also, in accordance with a preferred embodiment of the invention, the evaporator bottoms produced by distillation of the NDMA-rich oil phase is combined with the reactor effluent prior to separation of the oil and the aqueous slurry phases.

Surprisingly, the overall yield based on starting materials is substantially increased and no difficulties are interposed in the nitrosation reaction.

While the reasons for the improvement in yield obtained by this invention are not fully understood, such improvement may be attributed to the "salting out" of greater proportions of the NDMA into the reaction oil layer, from which the NDMA is directly recovered by simple evaporation, to the elimination of involved procedures for recovery of NDMA from dilute aqueous solutions, wherein handling losses inevitably result, and to the surprising and unexpected phenomena that the saturated salt solution introduced into the nitrosation zone does not depress or otherwise slow the reaction but actually promotes more complete reaction of the reactants. It will be appreciated that this invention is not limited by the above probable explanation for the improvement in overall yield obtained by the present invention.

As indicated, the process may be carried out either batchwise or continuously. The accompanying drawing is a flow sheet of a preferred arrangement of apparatus for practicing the invention continuously. It will be appreciated, however, that the invention is not to be limited to such continuous procedure and, as noted, includes batch procedures.

Referring to the drawing, 10 is a nitrosation reactor equipped with an agitator 11 and a jacket 12, through which a suitable cooling medium, e.g. water, may be circulated to maintain the reaction temperature at 60° C. to 90° C. For this purpose, jacket 12 is provided with an inlet line 13 and an exit line 14. Line 15 supplies to the nitrosation reactor 10 dimethylamine acid salt, for example, dimethylamine sulfate prepared by dissolving dimethylamine in an excess of concentrated sulfuric acid. Reactor 10 communicates with a mixing tank 16 through a line 17. Mixing tank 16 is provided with an agitator 18 and a supply line 19 for the supply of sodium nitrite. A water line 21 communicates with line 22 through which aqueous sodium sulfate (or sodium chloride, when hydrochloric acid is used instead of sulfuric acid) solution flows into the mixer 16. The resultant slurry of sodium nitrite in the aqueous sodium sulfate solution produced in mixer 16 is introduced into the reactor 10 through line 17.

From reactor 10, the reactor effluent flows continuously into vessel 23 provided with an agitator 24. Alkali, such as aqueous sodium hydroxide solution or sodium carbonate, is fed to vessel 23 through line 25. The neutralized reactor effluent flows through a heat exchanger 26 where it is cooled to 35° to 60° C. and then into decanter 27. Here the reactor effluent separates into two layers, an upper NDMA-rich oil layer and a lower aqueous slurry of salt containing a small amount of NDMA.

The oil layer flows from decanter 27 through line 28 into an evaporator 29 heated by a heating coil 31. The bulk of this layer, say from 75% to 95%, is vaporized and the vapors condensed in condenser 32, producing an NDMA solution containing from 35% to 50% NDMA suitable for catalytic hydrogenation by known techniques to produce unsymmetrical dimethylhydrazine.

The evaporator bottoms produced in evaporator 29 are recycled through the line 33 for admixture with the neutralized reactor effluent flowing from the neutralizer 23 to the cooler 26.

The NDMA salt slurry constituting the lower layer in the decanter 27 flows through line 34 into a filter or centrifuge 35 where separation of the salt from the saturated aqueous solution is effected. The separated solution flows through line 36 into line 22 leading to the mixing tank 16. The salt separated in filter or centrifuge 35 is passed through a line 37 into washer 38 supplied with water through line 39. In washer 38 the salt is washed free of NDMA. Salt thus freed of NDMA is removed through line 41. The wash water flows through line 42 into line 22 to the mixing tank 16 hereinabove described.

Recirculation of the distillation residue from evaporator 29 through line 33 for admixture with the neutralized reactor effluent flowing from the neutralizer 23 to the cooler 26 and recycle of the saturated solution from filter or centrifuge 35 through the reactor 10, results in the removal of more salt from the filter or centrifuge 35 and thus avoids salt build-up which would interfere with operations.

The following examples are given for illustrative purposes. It will be understood the invention is not limited to these examples.

In the examples, all temperatures are given in ° C. and parts are by weight.

EXAMPLE I.—BATCH OPERATION

*Part 1*

A mixture containing 280 parts dimethylamine, 281 parts sulfuric acid and 329 parts water was placed in a jacketed flask equipped with an agitator; water at 70° was circulated through the jacket. To this mixture was added over a 35-minute period a solution consisting of 456 parts sodium nitrite and 882 parts water. Temperature of the reaction solution was 69–74°. The reaction mass was neutralized to pH 9 with sodium hydroxide; the precipitated sodium sulfate, amounting to 279 parts, was filtered off. The precipitate was washed with water, resulting in 601 parts wash water containing 0.8% NDMA and 28.9% $Na_2SO_4$. The original reactor liquid phase was separated, yielding 779 parts oil layer containing 32.5% NDMA and 1136 parts aqueous layer containing 7.6% NDMA and 20.4% sodium sulfate. On the basis of dimethylamine fed, yields of NDMA were: 54.8% in the oil layer; 18.8% in the aqueous layer; and 1.1% in the filter cake wash water.

*Part 2*

The same reaction vessel was charged with 279 parts dimethylamine, 320 parts sulfuric acid and 284 parts water. To this was added over a period of 35 minutes a slurry composed of 455 parts $NaNO_2$ and 194 parts water mixed with 1008 parts of the aqueous layer from Part 1, comprised of 206 parts $Na_2SO_4$, 77 parts NDMA and 725 parts water. Temperature range during reaction was 69–78°. The reaction mass, at pH 4–5, was neutralized to pH 7–8 with NaOH and the salt (589 parts), oil (967 parts) and aqueous phases (939 parts) were separated at 50–60° as before. The salt layer was washed with water, resulting in 377 parts wash water containing 3.3% NDMA and 26.8% $Na_2SO_4$. The oil phase contained 39.5% NDMA and the aqueous phase contained 6.5% NDMA. In Part 2, conducted in the presence of $Na_2SO_4$ recycled from Part 1, both quantity of oil layer and concentration of NDMA therein were greater than in Part 1. On the basis of dimethylamine fed to Part 2, yields of NDMA were 83.3% in the oil layer and substantially 0% in the combined aqueous layer and salt cake water wash, NDMA content of which (73.5 parts) was virtually equivalent to the NDMA recycled from Part 1. The aqueous material, less samples, was held for the next run.

*Part 3*

The same reaction vessel was charged with 270 parts dimethylamine, 309 parts $H_2SO_4$, and 275 parts water. To this was added over a period of 30 minutes a slurry composed of 440 parts $NaNO_2$ and most of the aqueous layer and salt cake water wash from Part 2, comprising in toto 236 parts $Na_2SO_4$, 861 parts water and 53 parts NDMA. Temperature range during reaction was 69–78°. After neutralization and separation of phases at 50–60° as before, there were obtained 590 parts wet salt, 854 parts aqueous layer and 954 parts oil layer. Water wash of the salt cake resulted in 296 parts solution containing 1.4%

NDMA. The original aqueous and oil phases contained, respectively, 4.1% and 41.8% NDMA. On the basis of dimethylamine fed to Part 3, yields of NDMA were 89.8% in the oil layer and a negative 3.2% in the combined aqueous layer and salt cake water wash, the negative yields indicating an actual transfer of NDMA from the aqueous recycle from Part 2 to the oil layer of Part 3, i.e., the net yield in the oil layer from Part 3 was 86.6%.

Overall yields of NDMA on dimethylamine fed to the three parts of this example, uncorrected for sampling loss, were 75.8% in the oil layers and 2.9% in the final aqueous layer.

EXAMPLE II.—CONTINUOUS OPERATION

In this example, parts are given in pounds per hour. The example was carried out in equipment of the type shown in the drawing.

A stream consisting of 8.25 parts dimethylamine sulfate, 0.54 part $H_2SO_4$ (excess acid), and 0.36 part water was continuously fed via line 15 to a glass lined jacketed reaction vessel 10 equipped with an agitator and through the jacket of which 70° water was circulated. Also fed to the vessel, via line 17, was a slurry consisting of 0.23 part NDMA, 8.60 parts water, 2.43 parts $Na_2SO_4$ and 6.34 parts $NaNO_2$. This slurry was continuously prepared by mixing together in vessel 16, 6.34 parts dry $NaNO_2$ via line 19, 2.81 parts make-up water via line 21, and 8.45 parts recycle aqueous phase, comprised of 0.23 part NDMA, 5.79 parts water, and 2.43 parts $Na_2SO_4$, via line 22. The reactor contents were maintained at 70–80°. The effluent, removed continuously through line 20, consisted of 6.40 parts NDMA, 10.47 parts water, 8.35 parts $Na_2SO_4$, 0.59 part $NaNO_2$, 0.22 part dimethylamine, and 0.75 part $H_2SO_4$. The effluent was neutralized in vessel 23 with 0.61 part NaOH dissolved in 1.42 parts water fed via line 25. The neutralizer effluent was combined with the bottoms stream from evaporator 29 by means of line 33, the latter stream consisting of 0.55 part NDMA, 0.05 part water, and 0.13 part $Na_2SO_4$. The combined stream passed through cooler 26 where it was cooled to 45°, and into decanter 27. The oil layer separating as the upper phase was continuously removed via line 28; it totalled 12.92 parts, consisting of 6.70 parts NDMA, 6.09 parts water, and 0.13 part $Na_2SO_4$. The oil layer was continuously vaporized in evaporator 29; the vapor was condensed in cooler 32, giving a product stream consisting of 6.15 parts NDMA and 6.04 parts water. The balance of the decanter feed separated as an aqueous slurry which was continuously removed from the bottom of the decanter through line 34 into centrifuge 35. The solid discharged from the centrifuge consisted of 0.02 part NDMA, 0.34 part water, and 7.00 parts $Na_2SO_4$. The liquid discharge comprised the recycle aqueous phase previously described as supplied to vessel 16 via line 22.

The quantities given in the above Example II were those prevailing once steady-state conditions were obtained. The net production of NDMA suitable for use in catalytic hydrogenation to produce unsymmetrical dimethylhydrazine was 6.15 parts based on 3.94 parts dimethylamine fed; this corresponds to a yield of 95 mol percent.

It will be noted that the present invention provides a safe and simple procedure of recovering the NDMA content of the aqueous salt-rich portion of the NDMA reactor effluent and thus avoids discarding the aqueous phase with consequent economic loss with respect to both NDMA and alkali metal sulfate or chloride, and also avoids the necessity for the chemical destruction of the highly toxic NDMA content of effluent liquors or distillation residues prior to discard. Moreover, the present invention eliminates the necessity of recovering NDMA from the aqueous phase where it is present in low concentrations, and recovery is complicated and costly. These results are accomplished without sacrifice to the yield; in fact, the yield is increased.

Since certain changes may be made in carrying out the above process without departing from the scope of the invention, it is intended that all matter contained in the above description shall be interpreted as illustrative and not in a limiting sense.

What is claimed is:

1. The process of synthesizing nitrosodimethylamine, which comprises reacting a non-oxidizing mineral acid salt from the group consisting of the sulfuric acid and hydrochloric acid salts of dimethylamine with an alkali metal nitrite from the group consisting of sodium and potassium nitrite, neutralizing the reaction mixture with alkali, separating an aqueous slurry of salt containing some nitrosodimethylamine from the neutralized reaction mixture, removing solid salt particles from the slurry and recycling the salt solution thus produced through the reaction zone where the reaction between the acid salt of dimethylamine and the alkali metal nitrite is carried out.

2. The process of synthesizing nitrosodimethylamine, which comprises reacting dimethylamine with sodium nitrite in the presence of an inorganic acid from the group consisting of sulfuric and hydrochloric acids, neutralizing the reaction mixture with alkali, stratifying the neutralized reaction mixture into a nitrosodimethylamine-rich oil phase and an aqueous slurry of salt containing some nitrosodimethylamine, separating the aqueous salt slurry from the oil phase, removing solid salt particles from the slurry and introducing the salt solution thus produced into the reaction zone where the reaction between the dimethylamine and the sodium nitrite is carried out.

3. The process of synthesizing nitrosodimethylamine as defined in claim 2, in which the said oil phase, after separation from the aqueous slurry, is distilled to drive off the nitrosodimethylamine, the residue from this distillation is mixed with the neutralized reaction mixture and the resultant mixture separated into nitrosodimethylamine-rich oil phase and an aqueous slurry phase.

4. The continuous process of synthesizing nitrosodimethylamine which comprises the following steps: step 1, continuously introducing into a nitrosation reaction zone an acid salt from the group consisting of sulfuric and hydrochloric acid salts of dimethylamine, alkali metal nitrite from the group consisting of sodium and potassium nitrite and an aqueous salt solution obtained from step 5, and reacting the dimethylamine acid salt and alkali metal nitrite to produce nitrosodimethylamine; step 2, neutralizing the reaction mixture from step 1 with alkali; step 3, removing from the mixture of step 2 an aqueous salt slurry phase; step 4, separating the solid salt from the aqueous slurry phase from step 3 to produce an aqueous salt solution; and, step 5, passing the aqueous salt solution produced in step 4 to step 1 of the process.

5. The continuous process of synthesizing nitrosodimethylamine which comprises the following steps: step 1, continuously introducing into a nitrosation reaction zone an acid salt from the group consisting of sulfuric and hydrochloric acid salts of dimethylamine, sodium nitrite and the slurry produced in step 9 and reacting the dimethylamine salt and sodium nitrite to produce nitrosodimethylamine; step 2, neutralizing the reaction mixture from step 1 with alkali; step 3, cooling the neutralized reaction mixture; step 4, stratifying the cooled reaction mixture into a nitrosodimethylamine-rich oil phase and an aqueous salt slurry phase; step 5, separating the oil phase from the aqueous slurry phase and distilling the oil phase to drive off overhead nitrosodimethylamine solution substantially free of salt; step 6, recycling the distillation residue from step 5 into admixture with the neutralized reactor effluent produced in step 2 and passing the resultant mixture into step 3; step 7, removing the aqueous slurry from step 5 and separating the solid salt particles therefrom; step 8, washing the salt thus separated to remove nitrosodimethylamine adhering thereto; and, step 9, mixing the washing liquid from step 8 with the aqueous solution produced in step 7 and with sodium nitrite to form the aqueous sodium nitrite slurry which is introduced into step 1 of the process.

6. The continuous process of synthesizing nitrosodimethylamine which comprises the following steps: step 1, continuously introducing into a nitrosation reaction zone dimethylamine sulfate, sodium nitrite, sulfuric acid and the slurry produced in step 9 and reacting the dimethylamine with the sodium nitrite at a temperature of from 50° to 90° C. to produce nitrosodimethylamine; step 2, neutralizing the reaction mixture from step 1 with sodium hydroxide; step 3, cooling the neutralized reaction mixture to a temperature of 35° to 60° C.; step 4, stratifying the cooled reaction mixture into a nitrosodimethylamine-rich oil phase and a lower aqueous sodium sulfate slurry phase; step 5, separating the oil phase from the aqueous slurry phase and distilling the oil phase to drive off overhead nitrosodimethylamine solution substantially free of salt; step 6, recycling the distillation residue from step 5 into admixture with the neutralized reactor effluent produced in step 2 and passing the resultant mixture into step 3; step 7, removing the aqueous slurry phase from step 5 and separating the solid sodium sulfate from the aqueous solution; step 8, washing the solid sodium sulfate thus separated to remove nitrosodimethylamine adhering thereto; step 9, mixing the washing liquid from step 8 with the solution produced in step 7 and with sodium nitrite to form the aqueous sodium nitrite slurry introduced into step 1.

7. The process of synthesizing nitrosodimethylamine, which comprises reacting from 0.87 to 1.2 mols of sodium nitrite with from 0.95 to 1.05 mols of dimethylamine in the presence of from 0.5 to 0.6 mol of sulfuric acid, neutralizing the reaction mixture with alkali, separating an aqueous slurry of salt containing some nitrosodimethylamine from the neutralized reaction mixture, removing solid salt particles from the slurry and recycling the salt solution thus produced to the reaction zone in which the reaction between the sodium nitrite and the dimethylamine is carried out.

8. The process of synthesizing nitrosodimethylamine, which comprises reacting from 0.87 to 1.2 mols of sodium nitrite with from 0.95 to 1.05 mols of dimethylamine in the presence of from 1.0 to 1.2 mols of hydrochloric acid, neutralizing the reaction mixture with alkali, separating an aqueous slurry of salt containing some nitrosodimethylamine from the neutralized reaction mixture, removing solid salt particles from the slurry and recycling the salt solution thus produced to the reaction zone in which the reaction between the sodium nitrite and the dimethylamine is carried out.

9. The process of synthesizing nitrosodimethylamine, which comprises the following steps: step 1, reacting, at a temperature of from 50° C. to 90° C., dimethylamine with sodium nitrite in the presence of an acid from the group consisting of sulfuric and hydrochloric acids and an aqueous sodium salt solution produced in step 6 to produce nitrosodimethylamine; step 2, neutralizing the reaction mixture from step 1 with an alkali from the group consisting of sodium hydroxide and sodium carbonate; step 3, cooling the neutralized reaction mixture from step 2 to a temperature of 35° C. to 60° C.; step 4, stratifying the cooled reaction mixture into a nitrosodimethylamine-rich oil phase and a lower aqueous sodium salt slurry phase; step 5, separating the oil phase from the aqueous sodium salt slurry phase and distilling the oil phase to drive off overhead nitrosodimethylamine solution substantially free of salt; and step 6, removing the aqueous sodium salt slurry phase from step 5, separating the solid sodium salt from the aqueous sodium salt solution and introducing this aqueous sodium salt solution into step 1.

References Cited in the file of this patent
UNITED STATES PATENTS
2,802,031      Horvitz _____ Aug. 6, 1957